Feb. 19, 1963 W. H. ROSS 3,077,754

APPARATUS FOR MAKING SEMICONDUCTOR UNITS

Filed July 31, 1958 3 Sheets-Sheet 1

INVENTOR
William H. Ross

BY Stevens, Davis, Miller & Mosher
ATTORNEYS

Feb. 19, 1963 W. H. ROSS 3,077,754

APPARATUS FOR MAKING SEMICONDUCTOR UNITS

Filed July 31, 1958 3 Sheets-Sheet 2

INVENTOR

*William H. Ross*

BY *Stevens, Davis, Miller & Mosher*

ATTORNEYS

Feb. 19, 1963 W. H. ROSS 3,077,754

APPARATUS FOR MAKING SEMICONDUCTOR UNITS

Filed July 31, 1958 3 Sheets-Sheet 3

INVENTOR

William H. Ross

BY Stevens, Davis, Miller & Mosher

ATTORNEYS

United States Patent Office 3,077,754
Patented Feb. 19, 1963

3,077,754
APPARATUS FOR MAKING SEMICONDUCTOR UNITS

William H. Ross, Dallas, Tex., assignor to Texas Instruments Incorporated, Dallas, Tex., a corporation of Delaware Filed July 31, 1958, Ser. No. 752,307
3 Claims. (Cl. 65—153)

This invention relates to a method of and apparatus for assembling and sealing semiconductor devices of the type that are encapsulated within a glass envelope and more particularly to sealing such devices in a pressurized inert atmosphere.

In the manufacture of semiconductor units such as point contact diodes and the like, it is well known to provide a point contact element with a glass bead or flange on the lead wire thereof and to locate the semiconductor element within a glass tube. The glass bead is then conventionally sealed within one end of the tube to encapsulate and hermetically seal the diode. The sealed glass envelope serves to preserve the elements of the diode in fixed, correctly adjusted, pressure contacting relationship and affords protection against atmospheric attack on the semiconductor. It is imperative that the seals be gas-tight for leaky or faulty joints or seals allow the atmosphere to attack the relatively sensitive semiconductor element, an occurrence that contributes substantially to unstable semiconductor characteristics and failure with time.

It is also known to seal the glass parts by indirect means such as by using high frequency energy and utilizing a heat-concentrating device positioned adjacent the glass parts to be sealed. This heat-concentrating device serves to translate the induced high frequency energy into the form of heat and to transfer the heat energy selectively to the glass parts to be sealed, thereby preventing the heat from damaging the semiconductor element. The heat-concentrating member is usually a material which is highly conductive and does not adhere to heat-softened glass. One such suitable material is graphite. However, in conventional apparatus the graphite heat-concentrating member is held in relatively free access to the atmosphere and it oxidizes rapidly due to the high operating temperatures. Thus, its life is quite short and replacement is frequent and costly.

An improved holder has already been proposed in a patent application by Wendell C. Brooke entitled "Semiconductor Assembling Apparatus," filed July 31, 1958, Serial No. 752,308, now Patent No. 2,962,574, issued on November 29, 1960. That application discloses a holder for holding a diode of the type described above in assembled relationship and providing a heat-concentrating ring within the holder for applying localized heat to the area to be sealed. The enclosure of the heat-concentrating ring within the holder protects it from the atmosphere and increases the sealing life of the ring approximately two and one-half times as compared to similar sealing performed openly in the atmosphere. The present invention constitutes an even greater improvement by providing a means for assembling and sealing the parts of the glass envelope for the diode in a pressurized non-oxidizing atmosphere.

By experimentation it has been found that the heat-concentrating ring of graphite when directly exposed to the atmosphere lasts for approximately forty sealing operations. Using the improved holder, however, with the ring enclosed within a holder, tests show the ring to last for approximately one hundred seals. By adopting the present invention, however, the ring was found to last for between six hundred and seven hundred sealing operations.

Therefore, it is the principal object of this invention to provide a method and apparatus for assembling and sealing the parts of the glass envelope of a semiconductor device in a pressurized non-oxidizing atmosphere.

It is an additional object of this invention to provide an apparatus which enable a semiconductor device to be encapsulated practically and expeditiously in an inert gaseous atmosphere or any other desired atmosphere.

It is a further object of this invention to provide a plurality of assembled semiconductor device holders and means for alternately introducing one of the holders into an enclosed housing having a desired atmosphere therein while the other semiconductor device holder is withdrawn from the housing for disassembly, for removal of the sealed diode, and for reloading by insertion of a pair of diode elements which are to be sealed in the next operation of the apparatus.

Other objects and further advantages of this invention will be apparent from the following detailed description taken in connection with the accompanying drawings illustrating a preferred embodiment.

For purposes of convenience, the remainder of the specification relates to the description of the method of and apparatus for assembling and sealing a semiconductor diode. However, it is to be expressely understood that the method is applicable to assembling and sealing transistors and other devices.

In general, this invention contemplates assembling and sealing of a diode of the type having a contact element with a glass bead on the lead wire thereof and a semiconductor element positioned at one end of an open glass tube. The two elements of the diode are assembled in correct contacting relationship with the glass bead located inside the tube at its open end. A heat-concentrating electrically conductive ring is positioned adjacent the top of the tube and the glass bead to fuse these parts together to make a leak-tight seal. The electrically conductive ring is heated to a high temperature by induction using an indirect heating means, such as, a radio-frequency coil. The ring forms, in effect, a short-circuited secondary of the coil. The diode elements are placed in a suitable holder which is positioned in gas-tight relationship within an enclosing housing. The desired atmosphere is introduced to the housing to surround the holder and the heat-concentrating ring contained therein, while radio-frequency electrical energy is applied to the ring thereby heating the ring and sealing the diode. By filling the enclosing housing with an inert gas, such as nitrogen under pressure, it is found that the heat-concentrating ring of graphite will last approximately fifteen times longer than the known prior art arrangements wherein the graphite or heat-concentrating ring is exposed to the atmosphere. In addition the diodes obtained have substantially improved properties.

The diode holders with the assembled diodes therein are carried on a slidable member and are movable to a position within the enclosing housing. In this position the holders are sealed by gasket means. The diode holder on the slidable member that is not within the housing may be disassembled to remove a finished sealed diode and to reload with new diode parts. In this manner, one operator can continuously work, unloading and loading one of the diode holders, while the glass envelope parts of a diode assembled in the other holder are being heat sealed.

Figure 1:
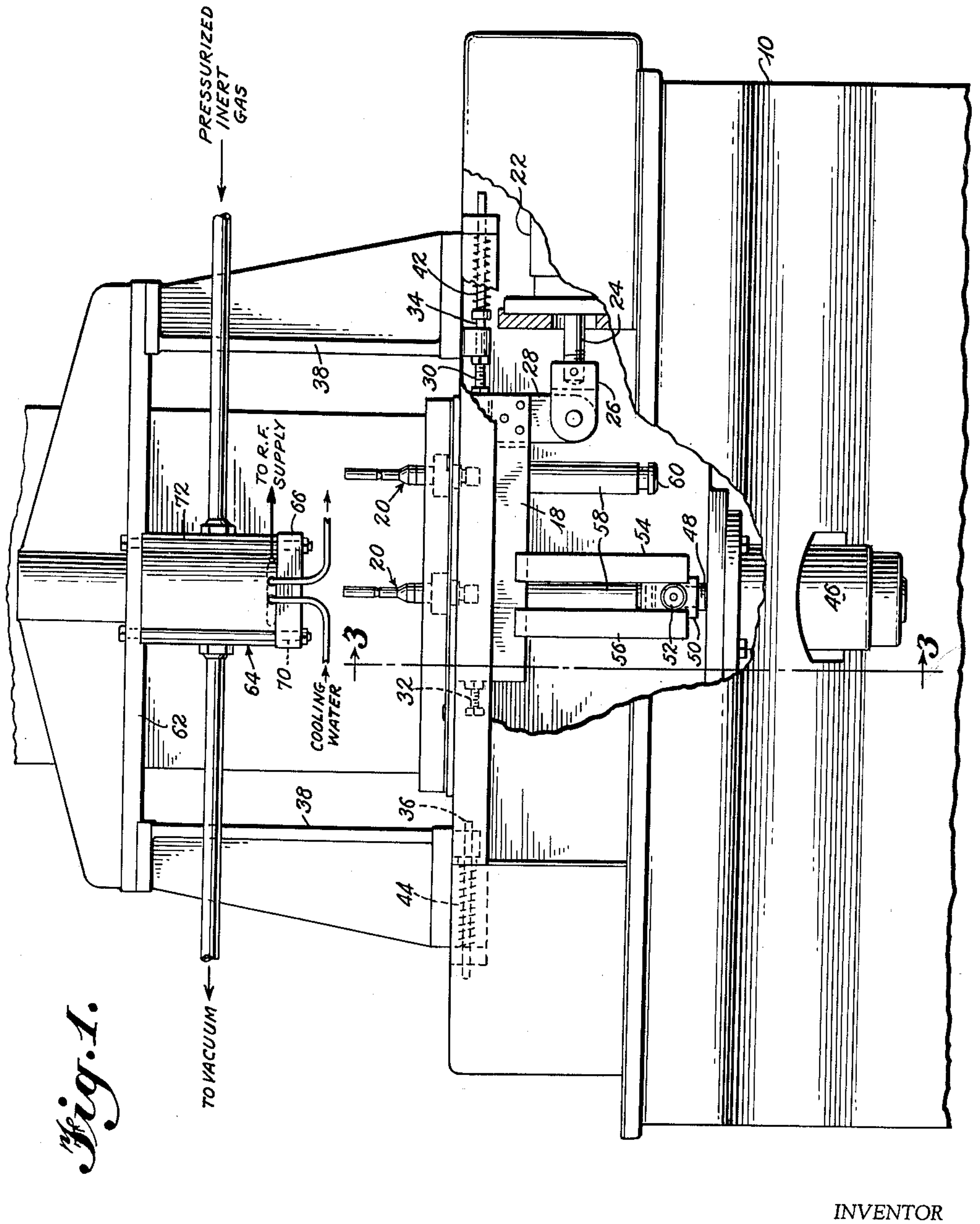
FIGURE 1 is a front elevation view partially in section of the apparatus of this invention.
Figure 3:
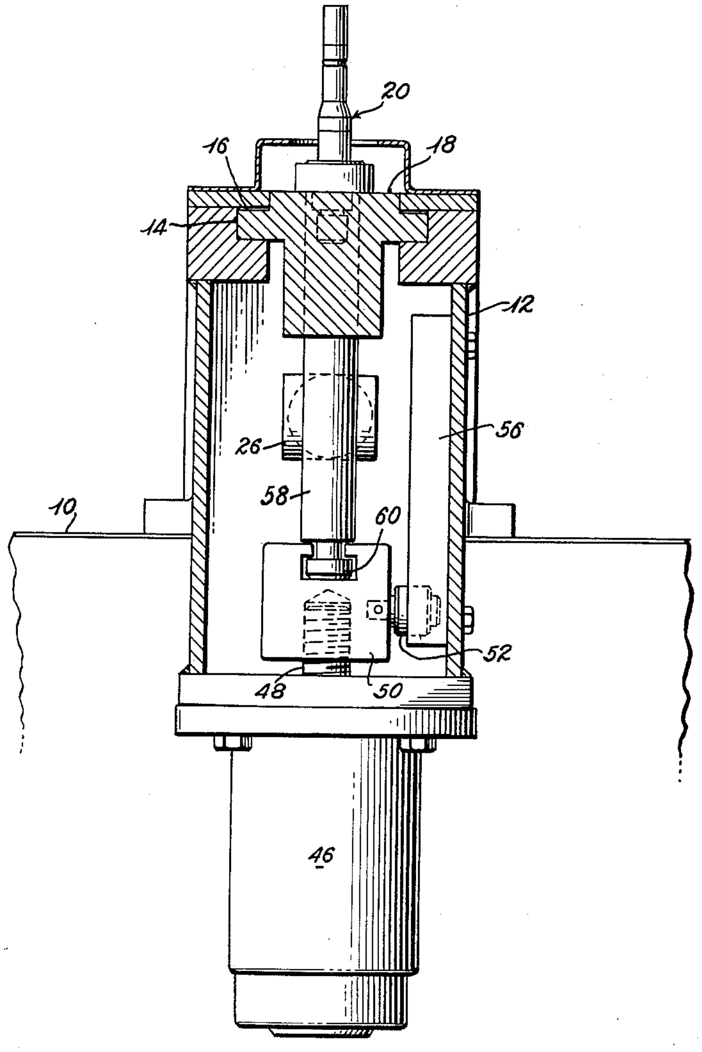
FIGURE 3 is a sectional view taken along lines 3—3 of FIGURE 1.

Referring to FIGURES 1 and 3 of the drawings, a base member 10, which may be a movable stand on caster wheels, supports a housing 12 having slides 14 and 16 forming an inner trackway therein. A slidable bushing 18 is mounted for sliding movement within the slides 14 and 16 and bushing 18 is adapted to receive a pair of diode holders 20 which are more fully shown and described in the above mentioned copending application of Wendell C. Brooke. Resting upon one surface of the base 10 is a reciprocating piston-type fluid motor 22 which is secured in position and has a piston rod 24 secured to a connecting link 26. Connecting link 26 is, in turn, pivotally attached to a depending lug 28 rigidly secured to slide member 18. By means of the fluid motor 22, the slide may be reciprocated horizontally as viewed in FIGURE 1. It is apparent that any suitable reciprocable feed with a positive return may be used in place of the fluid motor 22. The ends of the slidable bushing 18 are provided with adjustable stop members 30 and 32 which cooperate with spring biased rods 34 and 36 mounted for reciprocation within portions of an upright member 38 supported on the base 10. Suitable springs 42 and 44, which bias the rods 34 and 36 respectively, provide a cushioning effect in the stopping of slide 18 at each end of its movement.

Another reciprocating piston-type fluid motor 46 is supported from the base 10 and is provided with a piston rod 48 having a yoke 50 attached thereto. Projecting from one side of the yoke 50 is a roller 52, the periphery of which engages a pair of vertical guide rods 54 and 56. By this means, the vertical movement of the piston rod 48 is continuously guided. A foot pedal (not shown) or any suitable electrical device may be used to control the sequence of the reciprocatory feed provided by the motors 22 and 46.

Slidable push rods 58, which are mounted for reciprocation within the bushing 18 to which the bottom part of the holders 20 are threadedly connected, each have a knob 60 on the lower end thereof for engagement within the yoke 50 to allow the power piston of motor 46 to move them vertically upward and return them to the starting position.

The upright member 38, supported on base 10, has a top cross beam 62 suspending the housing generally indicated at 64, which housing encloses the diode holders 20 during the final sealing operation and acts as a backup mans to absorb the impact or thrust from motor 46.

Figure 2:
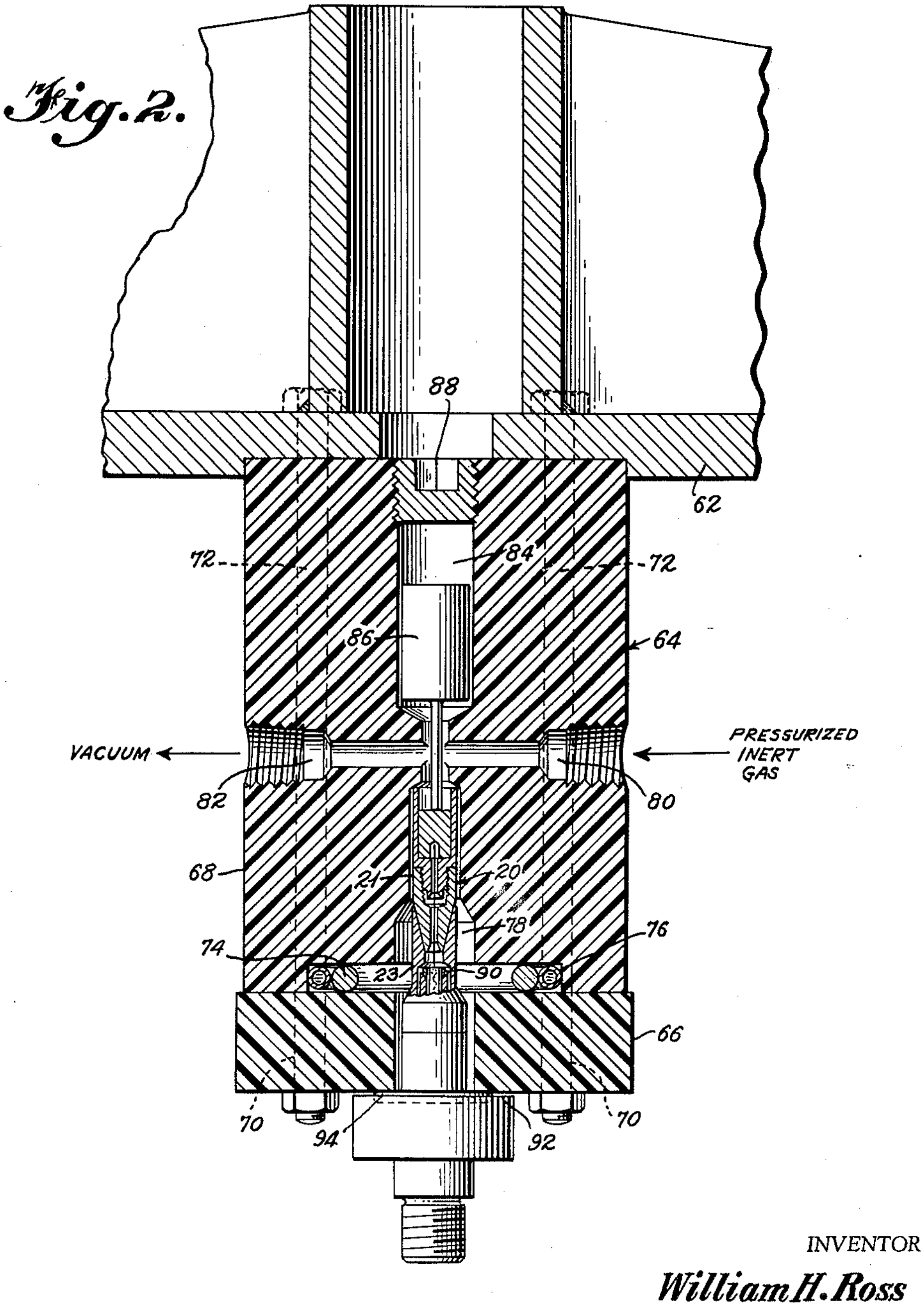
FIGURE 2 is a detailed elevation view partially in section showing the diode holder and enclosing housing for selectively controlling the atmosphere in which the diode is sealed.

The housing 64 is shown in more detail in FIGURE 2, and consists of a bottom closing plate 66 and an upper housing 68. The bottom plate 66 has a plurality of screw holes 70 therein for attaching the housing 64 to the top beam 62 through the intermediary of a plurality of stay bolts 72. Positioned immediaately above the bottom plate 66 is a single turn U-shaped radio-frequency coil 74 which is constructed of copper or of any other suitable conducting material. A cooling pipe 76 is attached to the coil for water cooling thereof. The lower portion 68 of the housing 64 has an enlarged central chamber 78 which is in communication with a pair of lateral ports 80 and 82. These ports have threaded inlets to allow suitable fluid conduits to be secured thereto. The chamber 78 extends upward to connect with another chamber 84 which contains a vertically reciprocable weight 86. This chamber is closed by a threaded plug 88.

The holder 20 consists of a pair of separable members 21 and 23 which totally enclose a graphite ring 90 serving as a heat concentration member. The graphite ring 90 is positioned a predetermined distance above the top surface of flange 92 of the holder 20. This distance is the same distance that the radio-frequency coil 74 is positioned above the bottom surface of housing plate 66. A suitable O-ring gasket 94 is provided on the surface of flange 92 to provide a gas-tight seal when the holder 20 is positioned within chamber 78 as shown in FIGURE 2. When the holder 20 is assembled and the fluid motor

46 is actuated to place the holder 20 within the housing 64, there is a loose fit between the body of the holder 20 and the chamber 78, while the flange 92 of the holder 20 is sealed by O-ring 94 to provide a gas-tight seal and prevent any leakage of gas. The holder itself is not gas tight and consequently the atmosphere in housing 64 will also exist within the holder and about the ring 90. The weight 86 will act as a plunger to ensure that the top portion of the holder 20 stays in its contacting relationship with the lower portion of the holder 20 while the glass enclosed diode is being sealed.

If desired, the diode may be sealed under vacuum and this vacuum is pulled through passage 82. However, better results are obtainable by utilizing the method of this invention which comprises evacuating the chamber 78 using passage 82 and then supplying an inert gas, such as nitrogen, under a suitable pressure, for example, 100 pounds per square inch through passage 80 . Any sealing pressure which leaves the inert gas pressure in the cooled diode above atmospheric pressure will improve the characteristics of the diode but it is preferred to seal the diode under a pressure of from 75 p.s.i. to 125 p.s.i. This gas will completely surround the holder 20 and graphite ring 90. R.F. energy is then applied to coil 74 thereby heating ring 90 and applying a sealing heat to the envelope parts of the diode in holder 20. It has been found that sealing of diode envelopes when the housing 66 is flooded with an inert gas under pressure results in the graphite ring 90 lasting approximately fifteen times as long as when this portion of the apparatus is merely subjected to a normal oxidizing atmosphere. The pressure of the inert gas within the sealed diode will naturally decrease as the temperature of the diode cools down to the ambient temperature. When the diode is at the ambient temperature, the inert gas will be at a pressure somewhat above atmospheric pressure. Diodes sealed by the method of the invention have been found to have improved operating characteristics. By way of explanation, the principal advantage obtained by the pressure sealing is the substantial reduction of the arcing across the diode through the medium of the air surrounding the diode. This arcing across occurs at relatively low voltages when the diode is not sealed under pressure.

It can be seen that the fluid motor 22 moves the slidable bushing 18 back and forth to allow the fluid motor 46 to move selectively the upper portions of the holders 20 within the housing 64. While the upper portion of one holder is positioned within the housing, the other holder may be loaded with the two diode components, or if there is a sealed diode therein it will be first unloaded. By these means an operator can work continuously and can substantially increase his production. Although there has been described manual loading and unloading of the diode holders and manual actuation of the piston-type fluid motors 22 and 46, it will be apparent to those skilled in the art that this could be accomplished by automatic means in accordance with a predetermined program. For example, the rods 34 and 36 could be connected to micro switches which would control the operation of motor 46.

The term "glass" as used herein includes other equivalent heat sealable materials usable as semiconductor envelopes.

The preferred embodiment of the method and apparatus disclosed herein is considered as illustrative only and various changes, omissions, and substitutions in form and detail will be apparent to one skilled in the art. Therefore, the invention disclosed herein is not to be limited by the foregoing detailed description but only by the spirit and scope of the appended claims.

What is claimed is:

1. An apparatus for heat treating a preselected area of a member having a plurality of component parts, comprising a holder to support said component parts of said member in a predetermined assembled configuration, said holder having a shoulder portion, a heat concentrating ring carried and completely enclosed by said holder, said heat concentrating ring being adjacent to and encircling the preselected area of said member to be heat treated, a housing defining an opening, means to supply an inert gas under pressure to the interior of said housing, a high frequency coil carried by said housing, and means to insert said holder into the opening of said housing so that said heat concentrating ring is positioned within said coil, said shoulder portion abutting said housing to form a gas-tight seal therewith when said heat concentrating ring is positioned within said coil.

2. An apparatus for successively heat treating preselected areas of a plurality of members each having a plurality of component parts, comprising a slidable member, a plurality of holders removably carried in spaced relation by said slidable member, each of said holders having a shoulder portion and being suitable for supporting the component parts of one of said plurality of members in a predetermined assembled configuration, a heat concentrating ring carried by each of said holders and completely enclosed thereby, said heat concentrating ring being adjacent to and encircling the preselected area of said one of said members, a housing defining an opening, means to supply an inert gas under pressure to the interior of said housing, a high frequency coil carried by said housing, means for moving said slidable member to successively position each of said holders in communicating relationship with said opening of said housing, and means to successively insert each of said holders into the opening of said housing when each of said holders is positioned in communicating relationship with said opening so that said heat concentrating ring is positioned within said coil, each of said shoulder portions of said holders abutting said housing to form a gas-tight seal therewith when said heat concentrating ring is positioned within said coil.

3. An apparatus for successively heat treating preselected areas of a plurality of members each having a plurality of component parts, comprising a slidable member, a pair of holders removably carried in spaced relation by said slidable member, each of said holders having a shoulder portion and being suitable for supporting the component parts of one of said plurality of members in a predetermined assembled configuration, a heat concentrating ring carried by each of said holders and completely enclosed thereby, said heat concentrating ring being adjacent to and encircling the preselected area of said one of said members, a housing defining an opening, means to supply an inert gas under pressure to the interior of said housing, a high frequency coil carried by said housing, means for moving said slidable member back and forth to alternately position each of said pairs of holders in communicating relationship with said opening of said housing, and means to successively insert each of said pair of holders into the opening of said housing when each of said holders is positioned in communicating relationship with said opening so that said heat concentrating ring is positioned within said coil, each of said shoulders of said pair of holders abutting said housing to form a gas-tight seal therewith when said heat concentrating ring is positioned within said coil.

References Cited in the file of this patent

UNITED STATES PATENTS

| | | |
|---|---|---|
| 828,318 | Johnson | Aug. 14, 1906 |
| 1,436,197 | Rohland | Nov. 21, 1922 |
| 2,432,491 | Thomas | Dec. 9, 1947 |
| 2,455,317 | Schneider | Nov. 30, 1948 |
| 2,480,364 | Hansen et al. | Aug. 30, 1949 |
| 2,508,233 | Dorgelo et al. | May 16, 1950 |
| 2,511,164 | Koch | June 13, 1950 |
| 2,522,949 | Jarman | Sept. 19, 1950 |
| 2,815,608 | Thomson | Dec. 10, 1957 |
| 2,877,603 | Wohlman | Mar. 17, 1959 |
| 2,902,796 | McDuffee | Sept. 8, 1959 |

FOREIGN PATENTS

| | | |
|---|---|---|
| 138,718 | Australia | Sept. 18, 1950 |